(12) United States Patent
Kurakata (10) Patent No.: US 7,016,091 B2
(45) Date of Patent: Mar. 21, 2006

(54) IMAGE PICKUP APPARATUS, STORING METHOD OF IMAGE DATA AND STORAGE MEDIUM THEREOF

(75) Inventor: Keihiro Kurakata, Kodaira (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 09/791,589

(22) Filed: Feb. 26, 2001

(65) Prior Publication Data

US 2002/0051260 A1 May 2, 2002

(30) Foreign Application Priority Data

Feb. 29, 2000 (JP) .............................. 2000-053007

(51) Int. Cl.
*H04N 1/46* (2006.01)
(52) U.S. Cl. ..................... 358/524; 358/1.16; 358/523; 358/1.9; 348/231; 348/232; 348/233
(58) Field of Classification Search ................ 358/1.9, 358/1.16, 523; 348/231, 232, 233
See application file for complete search history.

(56) References Cited

U.S. PATENT DOCUMENTS

| | | | | |
|---|---|---|---|---|
| 5,170,466 A | * | 12/1992 | Rogan et al. ................ 715/530 |
| 5,585,845 A | * | 12/1996 | Kawamura et al. ....... 348/231.2 |
| 5,634,091 A | * | 5/1997 | Sands et al. ................ 358/1.18 |
| 6,098,077 A | * | 8/2000 | Sassa .......................... 707/202 |
| 6,192,191 B1 | * | 2/2001 | Suga et al. .................. 386/120 |
| 2003/0016376 A1 | * | 1/2003 | Narushima ................. 358/1.13 |

FOREIGN PATENT DOCUMENTS

| | | |
|---|---|---|
| JP | 62-173863 | 7/1987 |
| JP | 05-316398 | 11/1993 |
| JP | 06-095979 | 4/2000 |
| JP | 2000-295576 | 10/2000 |

* cited by examiner

*Primary Examiner*—Kimberly Williams
*Assistant Examiner*—Michael Burleson
(74) *Attorney, Agent, or Firm*—Fitzpatrick, Cella, Harper & Scinto (57) ABSTRACT

In order to realize to improve safety performance of a filing system by satisfying the minimum requirement of protecting the filing system even if a shooting operation is performed in any condition, management information of a file for a shot image is to be priorly written in a storage medium, and the management information of the filing system is to be updated immediately after performing the shooting operation even if the shooting operation is performed in any condition. Accordingly, even if an unexpected accident such as detaching of a storage medium or extraction of a power supply unit by a user is happened, since the minimum requirement of protecting the filing system is satisfied, it is possible to prevent a state that image data which was already shot can not be accessed.

20 Claims, 9 Drawing Sheets

IMAGE PICKUP APPARATUS, STORING METHOD OF IMAGE DATA AND STORAGE MEDIUM THEREOF

BACKGROUND OF THE INVENTION

1. Field of the Invention

The present invention relates to an image pickup apparatus, a storing method of image data in the image pickup apparatus and a storage medium thereof, and more particularly to a storing procedure of storing the image data to a filing system in the image pickup apparatus and protection of the filing system.

2. Related Background Art

There has been known an image pickup apparatus which temporarily stores image data in a first storage means after converting a digitized image signal, to which digital signal processing is executed, into desired format image data, and then stores the image data in a detachable second storage means (hereinafter, called storage medium) for finally storing the image data.

In the image pickup apparatus structured as above, the detachable storage medium is divided into a first area and a second area. The first area is used as a management area for managing image data files. The second area is used as a data area (cluster area) for storing image data themselves of the image data files. The filing system is structured by the above-mentioned file management area and the data area.

Image data obtained by performing a shooting operation is temporarily stored in a main memory. The image data temporarily stored in the main memory is stored in the storage medium asynchronously with the shooting operation as an image file format.

Figure 7:
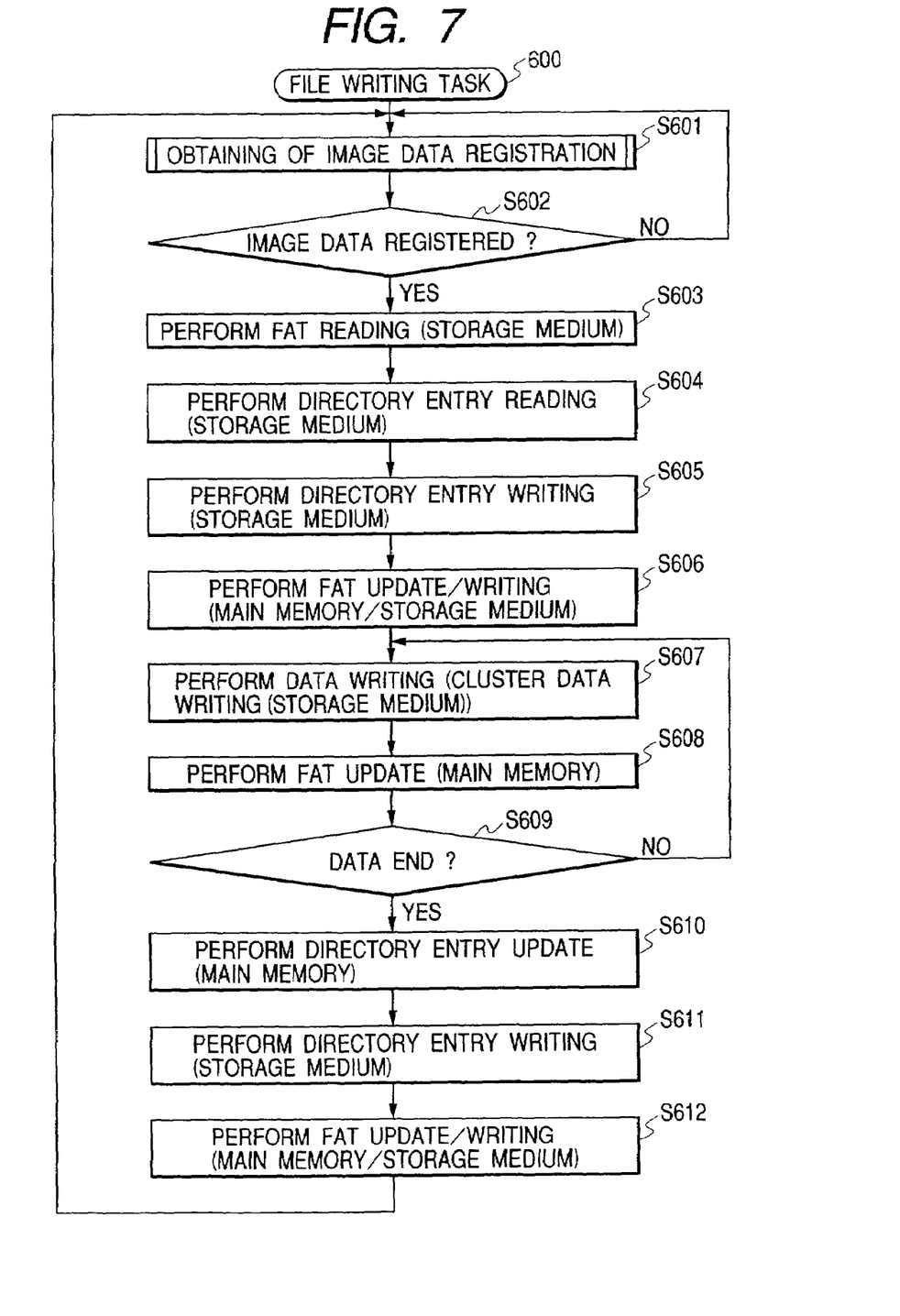
FIG. 7 is a flow chart showing a flow of writing the files to the storage medium.
Figure 8:
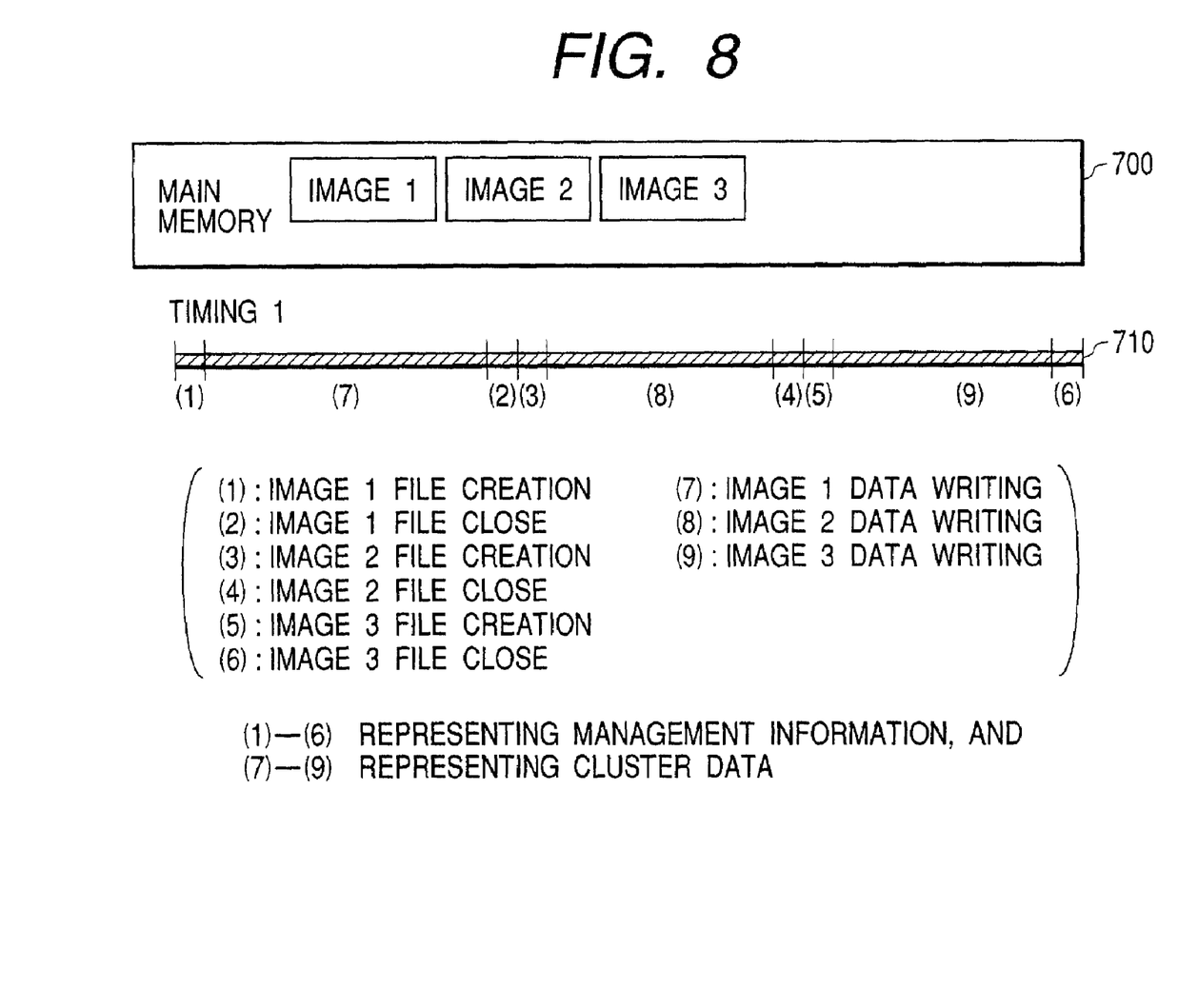
FIG. 8 is an explanation view showing timing and a processing procedure of writing files of plural images to a storage medium in a conventional image pickup apparatus.

In a conventional image pickup apparatus, a writing operation of writing the image data files in the storage medium is performed in accordance with a procedure in a flow chart shown in FIG. 7. It should be noted that FIG. 8 is an explanation view which indicates timing and a processing procedure of writing the files from the main memory for temporarily storing plural image data to a final storage medium.

Initially, when the shooting operation is performed, a file writing task 600 is started, and image data to be recorded is registered in this task (step S601).

Then, it is judged whether or not the image data is registered (step S602). If the image data is not registered, the flow returns to the step S601. If the image data is registered, FAT (file allocation table) information is read from a management area 210 on the main memory (step S603), and a blank area (blank cluster area) is searched.

Subsequently, data of the cluster for storing a directory entry of the image data file is read on the main memory (step S604), the directory entry of the image data file to be added is written, and the cluster data is rewritten to an origin cluster (step S605), thereby performing an update of the FAT and writing of the FAT (step S606) (state that a file is formed on a storage medium) (operation (1) in FIG. 8).

Next, in order to write the image data itself on the storage medium (operation (7) in FIG. 8), a blank cluster area is searched from the FAT information read on the main memory, and the FAT information (link information of FAT) on the main memory is updated (step S608) while sequentially writing the image data itself to the corresponding blank cluster area on the storage medium (step S607).

Next, it is judged whether or not the data is in an end state (step S609). When the image data itself is completely written on the storage medium, a FAT entry (link information to a first cluster) in the directory entry of the image data file preserved on the main memory is set, size of the image file is set (step S610), and the cluster data including this directory entry is rewritten to the origin cluster (step S611).

(State that a file is formed on the storage medium, link information of the FAT is defined, and image file size is also defined.) Finally, the updated FAT information on the main memory is rewritten to a predetermined management area in the storage medium (step S612), thereby terminating a series of file writing operations (operation (2) in FIG. 8).

In the conventional image pickup apparatus, if sequential shooting operations are performed, plural image data are accumulated on a main memory (700) and a cycle of forming the image data, data writing and a file close is repeated as indicated by timing written in a storage medium 710 when the plural shot data are sequentially written to the storage medium as image files. (refer to FIG. 8)

By the way, size of the image data in the image pickup apparatus tends to increase with the increase of the number of pixels in a pickup element. In order to improve capability in high-speed shooting of the image pickup apparatus or shorten a shooting interval, large image data is temporarily stored in the main memory of large capacity (700), and the large image data (plural image data) are to be sequentially written to the final storage medium (710).

Generally, writing speed to the storage medium can not catch up to the shooting operation because of the improvement of capability in the high-speed shooting or shortening of the shooting interval. In case of utilizing a storage medium of slow speed writing, image data which is not written and remained in the main memory is written to the storage medium for several seconds after performing the shooting operation.

Therefore, there is sufficient possibility that a user of the image pickup apparatus detaches the storage medium from the image pickup apparatus or extracts a power supply unit (battery) by assuming that the image data was written in a file when the shooting operation was terminated.

Since the image data files are sequentially written to the storage medium, writing of management information of the image file is performed until writing the image data stored in the main memory to the file is terminated after terminating the shooting operation (operations (2), (4) and (6) indicated as timing written in the storage medium 710 in FIG. 8).

Therefore, there is sufficient possibility that the filing system on the storage medium is destructed because the user of the image pickup apparatus erroneously detaches the storage medium or extracts the battery in process of writing the management information of the image file. In an area where the management information is recorded, since management information for managing another image is also stored, there was a risk of disabling to access to another image data before shot because the filing system itself is destructed owing to the above-mentioned erroneous operation.

That is, after terminating the shooting operation, if a storage medium 105 is detached until timing of the operation (6) written in the storage medium 710 shown in FIG. 8 (file close of final image data 3), there is possibility of destructing the filing system.

Since remaining capacity of the battery is in a low level, all of the image data can not be written to the storage medium and the power is down in process of writing the management information of the image file. Therefore, also, there was sufficient possibility of destructing the filing system.

Conventionally, for the above-mentioned possibility, there considered a method of giving an attention to the user of the image pickup apparatus using an instruction manual or backing up the image data not written on the main memory.

However, there sometimes occurred a problem that the user of the image pickup apparatus erroneously detaches the storage medium or extracts the battery. Furthermore, in order to back up the image data on the main memory, since the large power is consumed, the backup system unfitted to a compact image pickup apparatus.

As described above, size of the image data in the image pickup apparatus tends to increase with the increase of the number of pixels in the pickup element. In accordance with the improvement of capability in the high-speed shooting of the image pickup apparatus or shortening of the shooting interval, large image data is temporarily stored in the main memory, and the large image data (plural image data) are sequentially written to the storage medium.

However, writing speed to the storage medium can not catch up to the shooting operation because of the improvement of capability in the high-speed shooting or shortening of the shooting interval. In case of utilizing the storage medium of slow speed writing, the image data which is not written and remained in the main memory is written to the storage medium for several seconds after performing the shooting operation.

There is sufficient possibility that the user of the image pickup apparatus detaches the storage medium from the image pickup apparatus or extracts the battery by assuming that the image data was written in the file when the shooting operation was terminated.

However, in a conventional operation of writing the image file, since the writing of the management information of the image file is performed until writing the image data stored in the main memory to the file is terminated after terminating the shooting operation, there is sufficient possibility that the filing system on the storage medium is destructed because the user of the image pickup apparatus erroneously detaches the storage medium or extracts the battery in process of writing the management information of the image file.

As mentioned above, when the filing system is destructed, there was a problem of disabling to access to the image data which is before shot. If the storage medium is extracted before reaching a predetermined timing after terminating the shooting operation, there was possibility of destructing the filing system.

Also, there was sufficient possibility of destructing the filing system since remaining capacity of the battery is in a low level, all of the image data can not be written to the storage medium and the power is down in process of writing the management information of the image file.

Conventionally, for the above-mentioned possibility, there considered a method of giving an attention to the user of the image pickup apparatus using an instruction manual or backing up the image data not written on the main memory. However, the above-mentioned method does not correspond to a complete coping method of preventing the destruction of the filing system.

Furthermore, in order to back up the image data on the main memory, since the large power is consumed, the backup system slightly unfitted to the compact image pickup apparatus.

SUMMARY OF THE INVENTION

An object of the present invention is to solve all of or at least one of the above-mentioned problems.

The present invention is applied in consideration of the above-mentioned problems, and an object is to improve safety performance of a filing system such that the minimum requirement of protecting the filing system can be realized even if a shooting operation is performed in any condition.

In order to achieve the above object, the present invention discloses an image pickup apparatus which comprises first storage means for temporarily storing image data, detachable second storage means for finally storing the image data as an image file, wherein the detachable second storage means is divided into a file management area for managing the image file and a data area for storing the image data itself of the image file, and writing control means for performing the writing of the image data to the file management area prior to the writing of the image data to the data area in case of storing the image data stored in the first storage means in the second storage means as the image file.

Another object of the present invention is to protect management information of plural images even if the plural images are shot when a continuous shooting operation is performed.

In order to achieve the above object, in addition to the above-mentioned structure, the present invention discloses an image pickup apparatus characterized in that the writing control means performs the writing of file management information of the latter shot image data prior to the writing of the former shot image data itself when plural image data not written to the second storage means exist in the first storage means, and the former shot image data itself of which a part is not written is written after terminating the writing of the file management information of the latter shot image data.

Other objects and features of the present invention will become apparent from the following detailed description and the attached drawings.

DETAILED DESCRIPTION OF THE PREFERRED EMBODIMENTS

Figure 1:
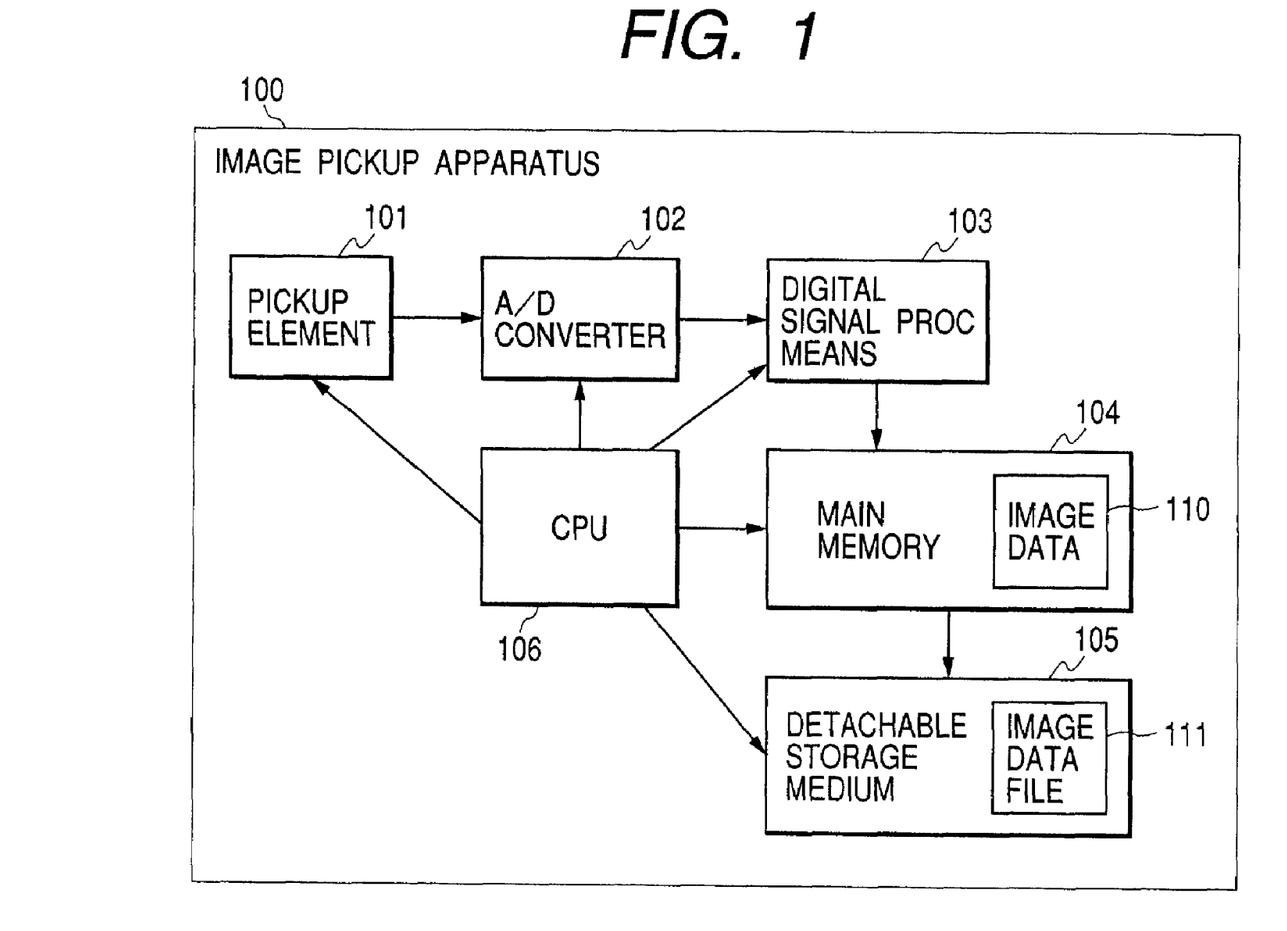
FIG. 1 is a block diagram showing the structure of an image pickup apparatus in the present embodiment.
Figure 2:
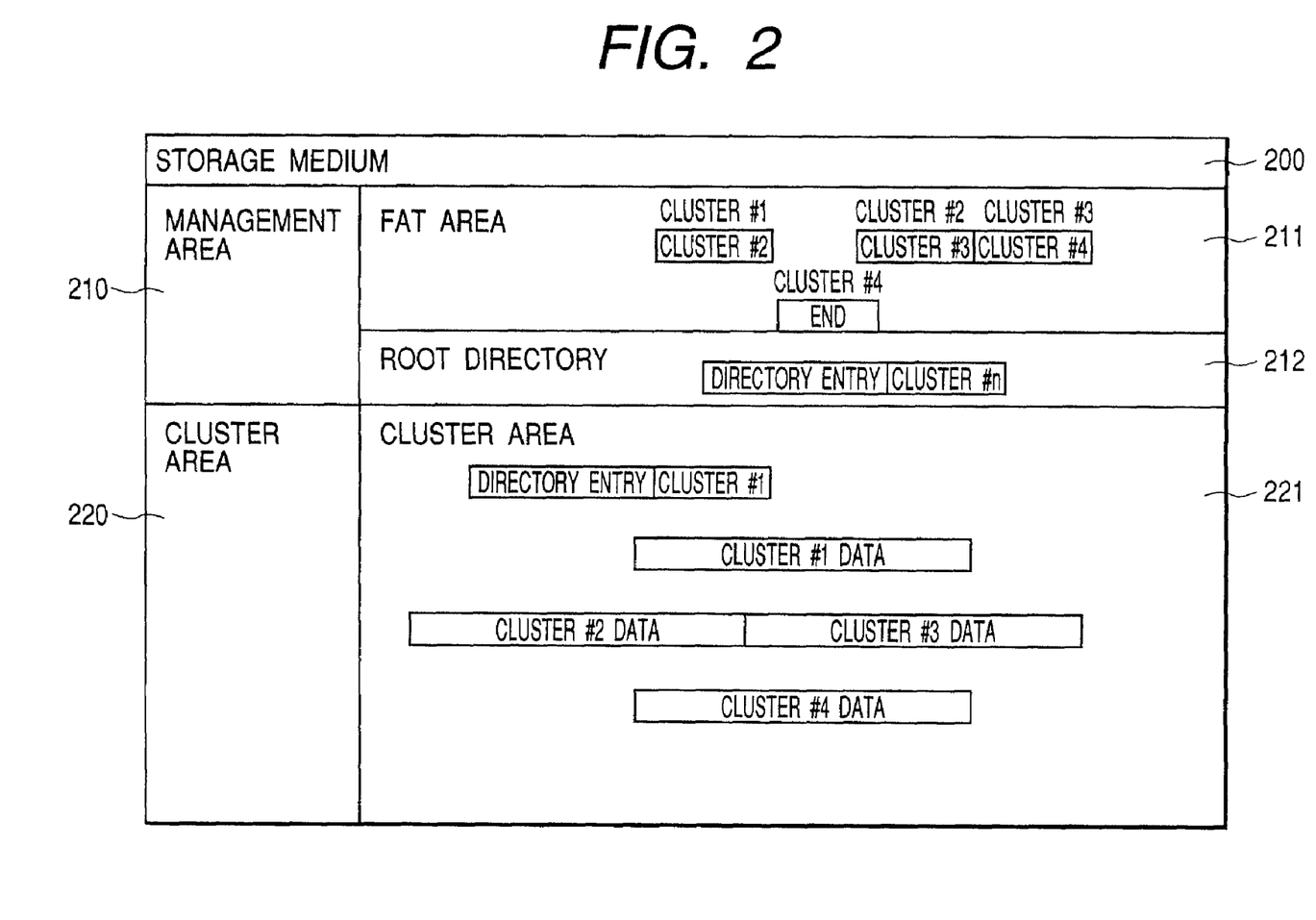
FIG. 2 is a view showing an example of the internal data structure of a storage medium used in the present embodiment.
Figure 3:
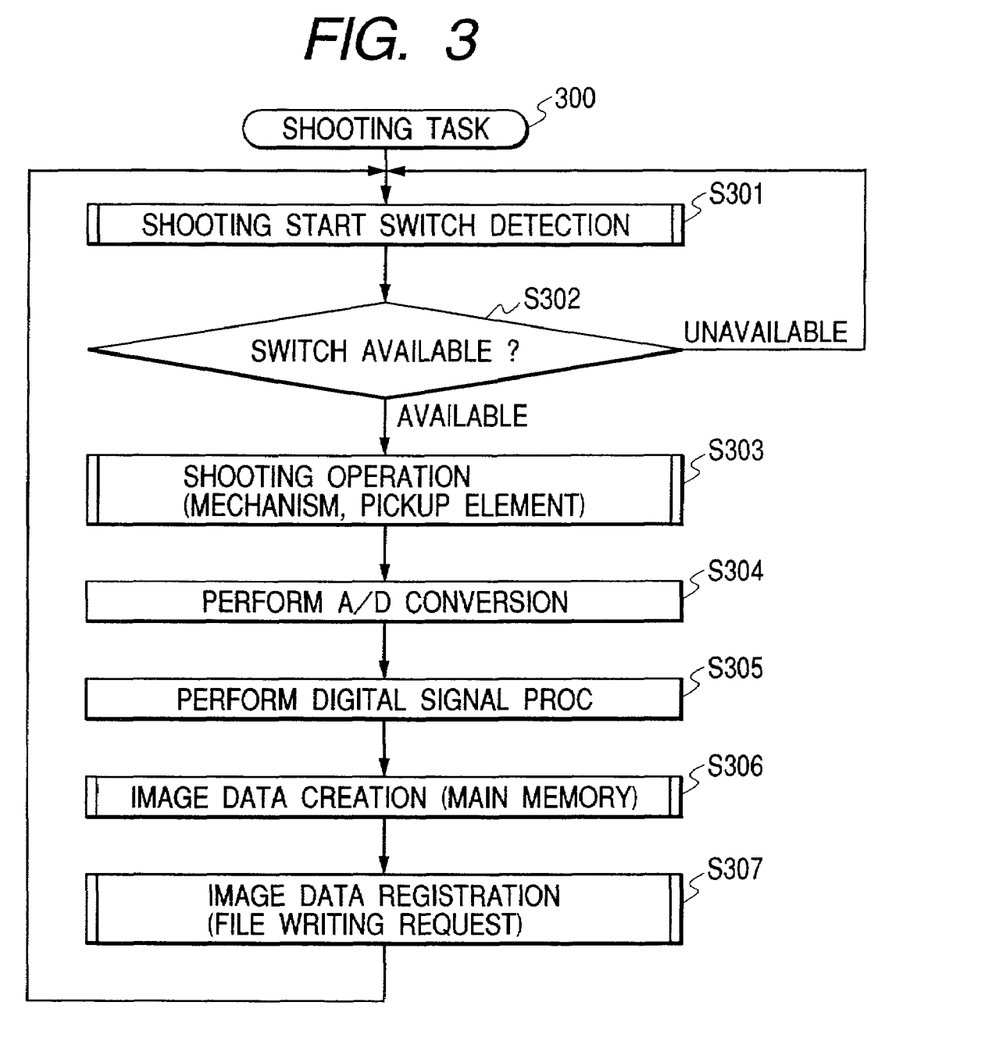
FIG. 3 is a flow chart of a task for executing shooting processing in a general image pickup apparatus.
Figure 4:
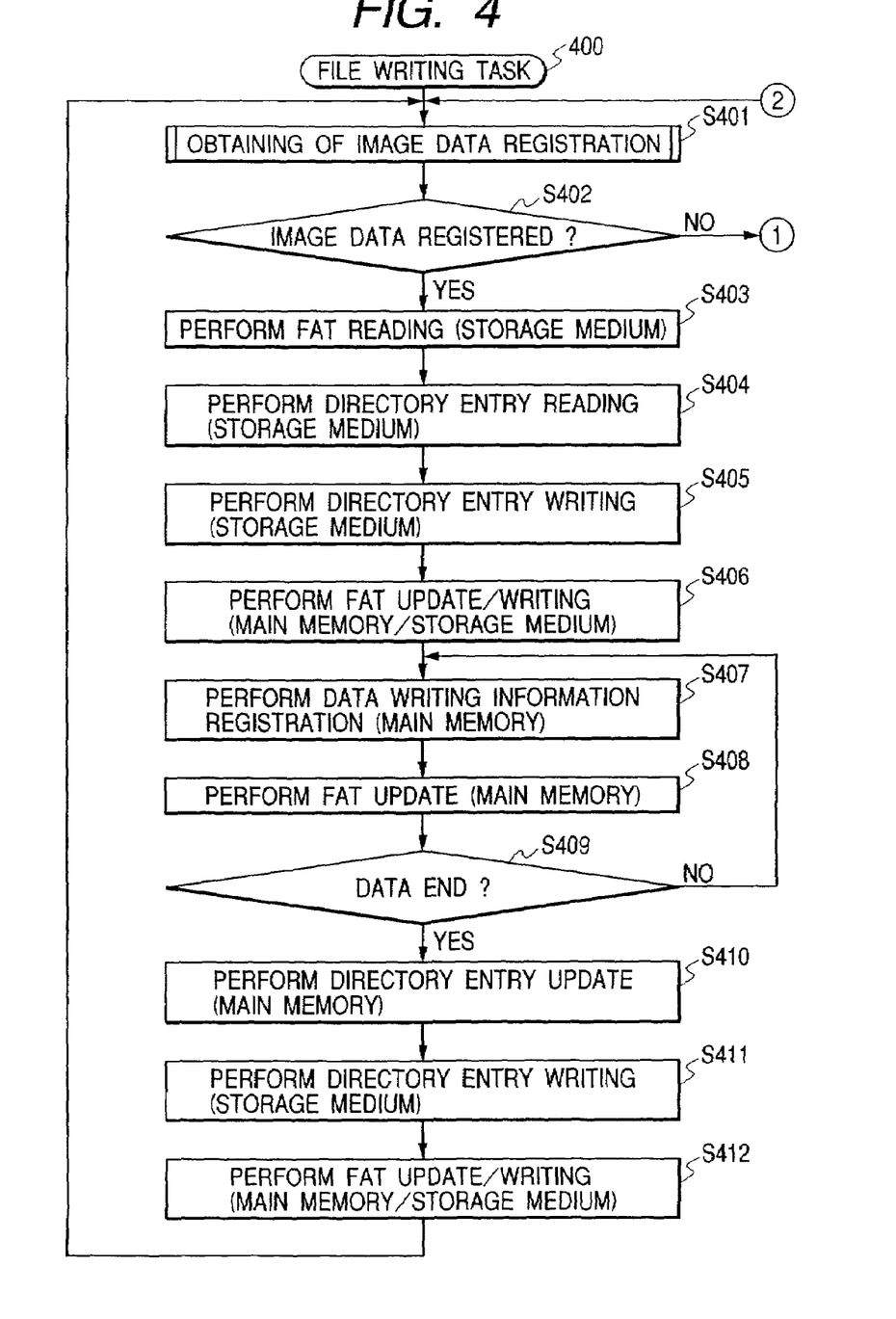
FIG. 4 is a flow chart showing a flow of writing files to the storage medium in the present embodiment.
Figure 5:
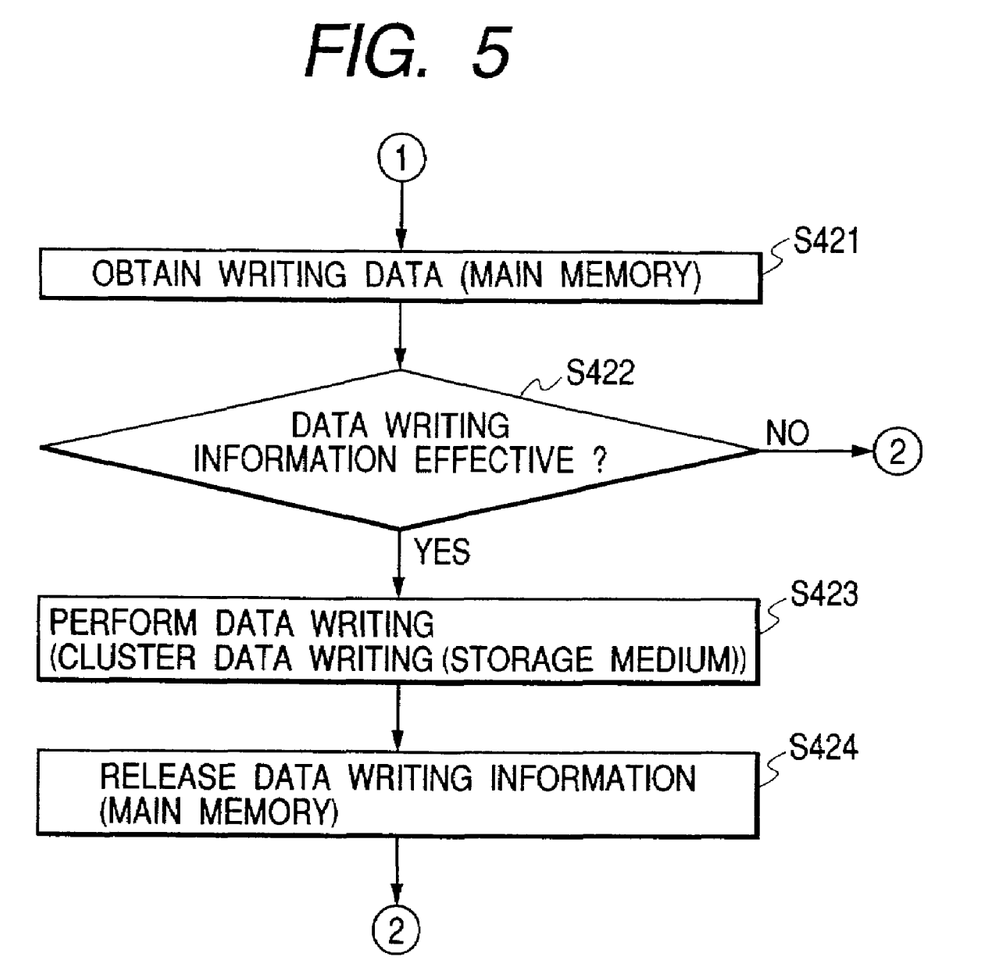
FIG. 5 is a flow chart showing timing and a processing procedure of writing the files of plural images to the storage medium in the present embodiment.

Hereinafter, embodiments of an image pickup apparatus, a storing method of image data in the image pickup apparatus and a storage medium thereof will be described with reference to the attached drawings. FIG. 1 is a block diagram showing the structure of the image pickup apparatus in the present embodiment. FIG. 2 is a view showing the internal structure of a storage medium 105 in a filing system treated in the present embodiment and a management method of files (MS DOS filing system). FIG. 3 is a flow chart of a task for controlling a shooting operation. FIG. 4 is a flow chart showing a writing procedure of the files in the present embodiment. FIG. 5 is a view showing the timing of writing the files in the present embodiment.

As shown in FIG. 1, an image pickup apparatus 100 in the present embodiment is composed of A/D conversion means 102 for digitizing an analog signal obtained by an image pickup element 101, signal processing means 103 for converting image data into desired format image data by executing digital signal processing to a digitized image signal, first storage means 104 (hereinafter, called a main memory) for temporarily storing image data created by the signal processing means, detachable second storage means 105 (hereinafter, called a storage medium) for finally storing the image data, and a CPU 106 for controlling an operation performed in each section.

In the above structured image pickup apparatus 100, the detachable storage medium 105 has a filing system structured by a management area 210 (hereinafter, called a management area) for managing an image data file 111 and a data area 220 (hereinafter, called a cluster area) for storing image data itself of the image data file as shown in FIG. 2.

Analog signal data obtained by the image pickup element 101 upon performing the shooting operation is digitized by the A/D converter 102, and the digital signal processing is executed to the digitized signal data, thereafter, it is temporarily stored in the main memory 104 as desired format image data 110. The image data 110 temporarily stored in the main memory 104 is stored in the storage medium 105 as the image file format 111 asynchronously with the shooting operation.

Next, a shooting task of the image pickup apparatus 100 will be explained with reference to the flow chart shown in FIG. 3. Upon starting the shooting operation, a shooting task 300 is started, and the image pickup apparatus 100 is controlled by the CPU 106 to detect a shooting start switch (step S301). Then, it is judged whether or not the detected switch is available (step S302). If the detected switch is available, the shooting operation is performed (step S303).

When the shooting operation is started, the analog signal is obtained by the image pickup element 101, and this obtained signal is converted into a digital signal by the A/D converter 102 (step S304). Signal data converted into the digital signal is processed by the digital signal processing means 103 (step S305), and the desired format image data 110 is created in the main memory 104 (step S306).

When the image data 110 is prepared in the main memory 104, the shooting task 300 issues image data registration (file writing request) to a file writing task 400 (step S307). The shooting task 300 is in a state of waiting for a next shooting start switch. The shooting task 300 is operating asynchronously with the file writing task 400.

Next, the file writing task 400 of writing file management information will be explained with reference to the flow chart shown in FIG. 4. In the present embodiment, the file management information is to be written in the storage medium 105 before writing the image data itself. The file writing task 400 is waiting for the image data registration (management information writing request) (steps S401 and S402), and a file forming operation (operation (1) written in a storage medium 510 in FIG. 6) is started by performing the image data registration by the shooting task 300 (step S307).

In the file forming operation, a FAT is read from a FAT area 211 in the storage medium 105 (step S403), and cluster data used for storing a directory entry of an image file to be newly formed is read (step S404). The directory entry of the image file to be newly formed is formed on the cluster data which is read and thus structured directory entry is rewritten in a cluster area 221 (step S405).

At this time, if the FAT is updated, the FAT on the main memory is updated. The updated FAT is written in the FAT area 211 of the storage medium 105 (Step S406). Following the file forming operation, an image data writing operation is performed.

In this image data writing operation, the writing of the cluster data to the storage medium 105 is not initially performed, and data writing information is registered in the main memory 104 (step S407). Then, the FAT on the main memory is updated (step S408). These steps are repeated until the above processing is terminated for all the image data (step S409). It should be noted that the above-mentioned data writing information is referred when the image data itself is actually written in the storage medium 105, and it is possible to discriminate whether or not the data is the image data written in the storage medium 105 by investigating the data writing information.

Since the above operation is performed on the main memory 104, the writing operation of writing the data to the storage medium 105 is not performed. Therefore, the operation is terminated in a moment. At a time point when the image data writing operation is terminated, the FAT on the main memory 104 is equalized with final FAT data when the image data writing operation is terminated.

Figure 6:
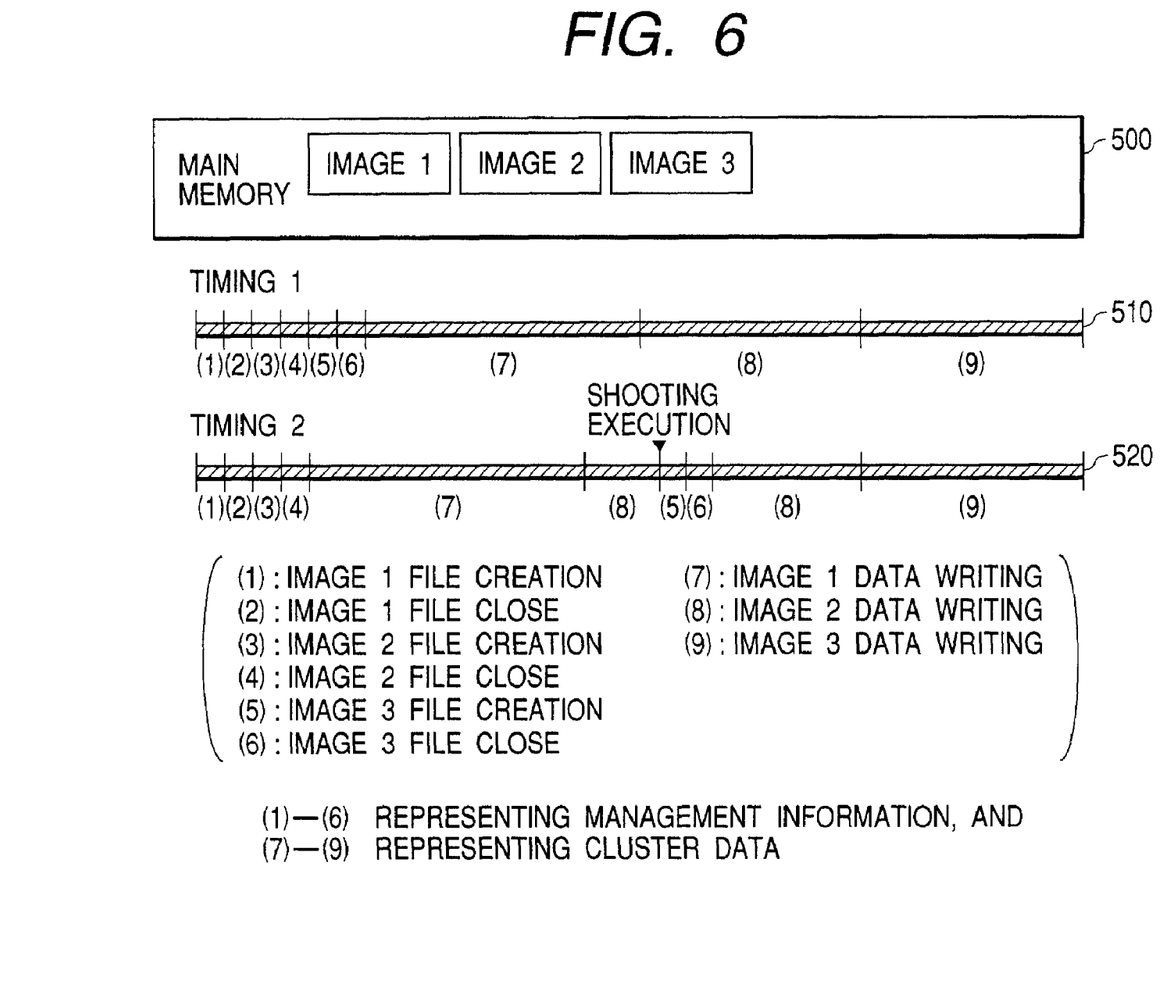
FIG. 6 is an explanation view showing the timing and the processing procedure of writing the files of the plural images to the storage medium in the present embodiment.

When the writing of the image data is terminated, a file close operation is started (operation (2) written in the storage medium 510 in FIG. 6). For the directory entry on the main memory 104, head cluster information and image file size are updated (step S410). The cluster data including the updated directory entry on the main memory 104 is rewritten in the cluster area 221 (step S411). Subsequently, the finally updated FAT data on the main memory 104 is written in the FAT area 211 of the storage medium 105 (step S412).

In this state, although the filing system is completed in theory as the image file, the image data itself is not yet written in the storage medium 105. However, as the filing system, there is no contradiction. Therefore, if the storage medium 105 is detached, the filing system is not destructed.

As above mentioned, since the writing of the image file in the management area of the storage medium is completed, the writing operation of writing the image data itself in the storage medium is subsequently started. However, when the plural image data 110 exist on the main memory 104 (main memory 500 in FIG. 6), since the writing operation of writing the image files (image 2 and image 3) in the management area of the storage medium 105 is prioritized, the above-mentioned sequence (from step S403 to step S412) is repeated. That is, when the plural image data exist on the main memory 104, the management information of the latter shot image is first recorded in the storage medium 105, and then the data itself of the former shot image is to be recorded (operations (2), (3), (4) and (5) written in the storage medium 510 shown in FIG. 6). When the writing operation of writing the image data 110 (image 1, image 2 and image 3 on the main memory 500 shown in FIG. 6) on the main memory 104 in the file management area is completed, the writing of the image data itself is started.

In the file writing task 400, since the image data is not registered, the obtaining of the image data itself to be written in the storage medium 105 is performed as indicated by the flow chart in FIG. 5 (step S421). Next, it is checked whether or not the obtained image data itself is not written in the storage medium 105 with reference to the data writing information. Then, it is judged whether or not writing processing of writing the data to the storage medium 105 is available (step S422). When it is judged that the data checked in the step S422 is to be written in the storage medium 105 (judged available in the step S422), actual data writing (writing of cluster data) is performed (step S423), and the data writing information on the main memory is released (to be unavailable) (step S424).

The writing of the image data is repeatedly performed until the data writing information recorded in the main memory 104 is perfectly released. In a state of writing the image data (operations (7), (8) and (9) written in the storage medium 510 in FIG. 6), when the user of the image pickup apparatus erroneously detaches the storage medium or extracts a power supply unit (battery), since the image data itself of which a part is not written exist, the image data itself is not correct data. However, since the former recorded file management information is correct, the filing system itself is not destructed.

In the present embodiment, when the plural image data 110 (image 1, image 2 and image 3) exist on the main memory 104, the timing likely to destruct the filing system is found in the state of executing the operations (1) to (6) written in the storage medium 510. As compared with the conventional example, the writing of the management information is terminated with the fast timing, that is, the time taken in protecting the filing system is shortened.

In addition to the above-mentioned timing, the timing when the shooting operation is performed in process of writing the image data itself is indicated as a timing 2 (refer to numeral 520 in FIG. 6). At the timing 2 (refer to numeral 520 in FIG. 6), data of the image 1 and the image 2 already exist in the main memory 104, and the file writing task 400 already completes the writing of management data of the image 1 (operations (1) and (2) written in the storage medium 520 in FIG. 6), the writing of management data of the image 2 (operations (3) and (4) written in the storage medium 520 in FIG. 6) and the writing of the image data itself of the image 1 (operation (7) written in the storage medium 520 in FIG. 6).

In process of writing the image data itself of the image 2 (operation (8) written in the storage medium 520 in FIG. 6), if the shooting operation is performed in the shooting task 300, an image 3 is newly created in the main memory 104 (step S306), and data of the image 3 is registered in the file writing task (step S307).

Although the file writing task 400 is writing image data of the image 2 (step S423), if the present writing of the cluster data is completed, the writing of the cluster data is released (step S424), and the obtaining of image data registration is performed (step S401).

At this time, according to the above description, since the image data registration for the image 3 is already performed, there find a state that the image data is registered (step S402). Accordingly, formation processing (5) of forming a file for the image 3 is executed, and a sequence from the FAT reading (step S403) to file close processing (6) for the image 3 (FAT update/writing (step S412)) is executed.

When the writing of the file management area for the image 3 (operations (5) and (6) written in the storage medium 520 in FIG. 6) is completed, the obtaining of the image data registration is performed (step S401), and the interrupted processing of writing the data of the image 2 (operation (8) written in the storage medium 520 in FIG. 6) is restarted (step S421) because new image data does not exist (step S402).

The image data writing information corresponds to a remaining part of the image 2 and image data itself of the image 3, and a sequence from the obtaining of the data writing information (step S421) to the release of the data writing information (step S424) via an execution of the data writing (step S423) is repeated.

In the above-mentioned case, the shooting operation is newly performed in process of writing the data of the image 2, and when data of the image 3 is created on the main memory 104, the writing of the data of the image 2 (operation (8) written in the storage medium 520 in FIG. 6) is interrupted, and the writing of the file management information of the image 3 (operations (5) and (6) written in the storage medium 520 in FIG. 6) is priorly performed. Therefore, at a time point when the writing of the file management information of the image 3 is terminated (operation (6) written in the storage medium 520 in FIG. 6), since the filing system itself is correct, the filing system is not destructed even if the user of the image pickup apparatus erroneously detaches the storage medium 105 or extracts the battery in the above condition.

(Second Embodiment)

In the present embodiment, a part of the main memory 104 in the above-mentioned first embodiment is assigned as third storage means which can back up the management information. Therefore, if the image data 110 exists in the main memory 104 and even when the storage medium is detached or the battery is extracted in process of writing the management information of the corresponding image file to the storage medium, the protection of a filing system is warranted more surely than that in the first embodiment by holding the management information of the image file in the above-mentioned backup area.

Figure 9:
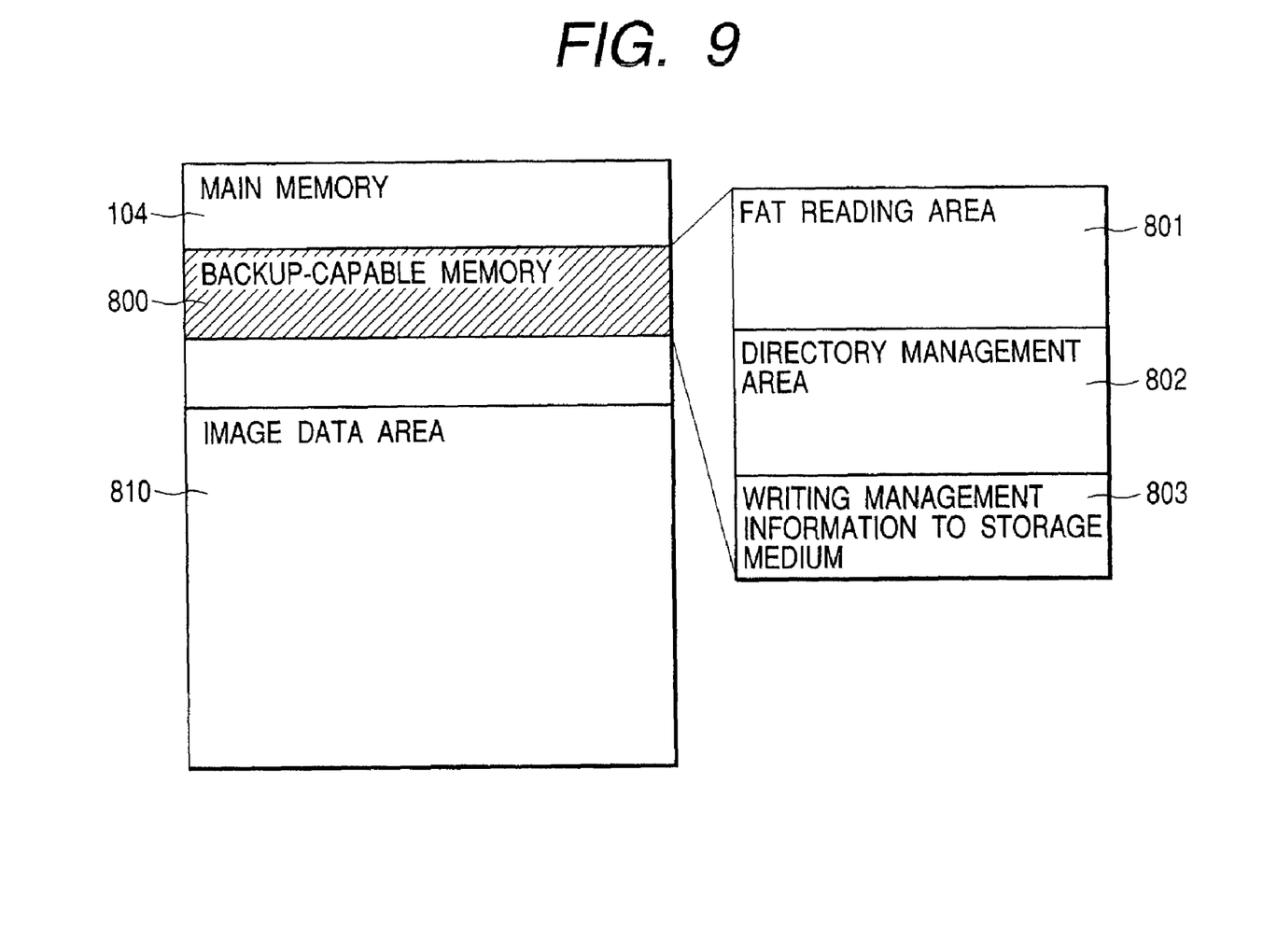
FIG. 9 is a view showing the structure of a main memory in a second embodiment.

FIG. 9 is a view showing the structure of the main memory 104 in the present embodiment. In FIG. 8, the main memory 104 includes a memory 800 which can back up the information and an image data area 810 of a non-volatile memory. Internal of the memory 800 which can back up the information is further divided into a FAT reading area 801, a directory management area 802 and management information 803 to be written to the storage medium.

After performing the shooting operation, the image data 110 is created in the image data area 810 in the main memory 104, and image file formation processing is started when the image data is registered in the file writing task 400.

In the image file formation processing, the FAT is read from the storage area 105 to the FAT reading area 801 (step S403). In this state, the management information 803 to be written to the storage medium is in a state of not written.

Subsequently, the directory entry is read from the storage medium 105 to the directory management area (step S405). In case of writing the directory entry of a newly formed file to the storage medium 105, the management information 803 to be written to the storage medium is in a state of being written, and the FAT reading area 801 and the directory management area 802 are in the state of backed up.

At a time point when the updating and writing of the FAT (step S406) are performed and the writing operation to the storage medium 105 is terminated, the management information 803 to be written to the storage medium is in a state of releasing a backup system. When close processing of the image file is executed, at a time point when the writing of the directory entry to the storage medium 105 (step S411) is started, the management information 803 to be written in the storage medium is in a state of being written, and the FAT reading area 801 and the directory management area 802 are in the state of backed up.

At a time point when the updating and writing of the FAT (step S412) are performed and the writing operation to the storage medium 105 is terminated, with respect to the management information 803 to be written in the storage medium, the backed up management information is deleted as the backup system released state. In this case, it may be available to overwrite the information without deleting the information.

In the state of writing the directory entry to the storage medium 105 (step S405 and step S411) or updating and writing the FAT (step S406 and step S412), in a case where the user of the image pickup apparatus erroneously detaches the storage medium 105 or extracts the battery, it is recognized that the storage medium 105 is not exchanged when the image pickup apparatus is restarted, and the writing operations to the storage medium 105 from the FAT reading area 801 and the directory entry management area 802 are performed on the basis of the management information 803 to be written in the storage medium, thereby realizing to prevent the destruction of the filing system.

In this structure, since the memory 800 capable of backing up can be served with the small capacity as compared with the capacity of the image data area 810, an advantage of consuming the little power used in backing up can be obtained.

(Another Embodiment)

The present invention is applicable to a system composed of plural equipments (e.g., a host computer, an interface equipment, a reader, a printer and the like) or to an apparatus including a single equipment.

The program codes of a software for realizing the functions of the above-described embodiments are supplied to an apparatus connected to the above-mentioned various devices or to a computer in the system such that the various devices are operated so as to realize the functions of the above-described embodiments, and then the object is achieved by operating the above-mentioned various devices in accordance with the program codes stored in the computer (CPU or MPU) of the system or the apparatus. The above case is also included in a category of the present invention.

In this case, the program codes themselves of the above-mentioned software are to realize the functions of the above-mentioned embodiments, and the program codes themselves and means for supplying the program codes to the computer, for example, the storage medium storing such the program codes constitutes the present invention.

The storage medium storing the program codes can be, for example, a floppy disk, a hard disk, an optical disk, a magnetooptical disk, a CD-ROM, a magnetic tape, a nonvolatile memory card, a ROM, or the like.

It is needless to say that the program codes are included in the embodiments of the present invention not only the case where the functions of the above-mentioned embodiments are realized by executing the supplied program codes by the computer, but also a case where the functions of the above-mentioned embodiments are realized by the cooperation of the program codes of an OS (operating system) functioning on the computer or another application software.

Further, the present invention includes a case where the supplied program codes are once stored in a memory provided in a function expansion board inserted in the computer or a function expansion unit connected to the computer, and a CPU or the like provided in the function expansion board or the function expansion unit executes all the process or a part thereof according to the instructions of such program codes, thereby realizing the functions of the embodiments.

As described above, according to the present invention, the file management information for the shot image is to be priorly written in the storage medium. Accordingly, even if the shooting operation is performed in any condition, since the update of the management information of the filing system is performed immediately after performing the shooting operation, the minimum requirement of protecting the filing system is satisfied if an unexpected accident such as detaching of a storage medium or extraction of a power supply unit by a user is happened. According to this structure, it is possible to avoid the case that the already shot image data can not be accessed, thereby improving safety performance of the filing system.

According to the present invention, when the plural image data exist in the first storage means, even if the image data itself not written for the second storage means exists, the writing of the file management information of newly formed image data is prioritized, and since the remaining image data itself which is not written is to be written after terminating the writing of the file management information, the safety performance of the filing system can be improved and the writing speed of the image data itself can be improved.

Further, according to the present invention, when the power is interrupted in process of writing the file management information of the image data to the second storage medium, the file management information of the image data can be stored. That is, when the power is turned on, in the next time, in case of not changing the second storage means, the file management information of the image data stored in the third storage means can be written to a predetermined position of the second storage means, thereby realizing to protect the destruction of the filing system due to the extraction of the battery.

The present invention is not limited to the above-mentioned embodiments, but may be modified in various manners within the scope of the following claims.

What is claimed is:

1. An image pickup apparatus comprising:
    first storage means for temporarily storing image data;
    detachable second storage means for storing the image data as an image file, wherein said detachable second storage means is divided into a file management area for managing the image file and a data area for storing the image data as the image file; and
    writing control means for writing file management information corresponding to the image data into the file management area prior to writing of the image data to the data area in a case of storing the image data stored in said first storage means in said second storage means as the image file, said writing control means being arranged so as to perform the writing of the management information corresponding to the image data to the file management area only once.

2. An image pickup apparatus comprising:
    image data creation means for digitizing an analog image signal obtained by an image pickup element and creating image data by converting the digitized image data into desired format image data;

first storage means for temporarily storing the image data;

detachable second storage means for storing the image data as an image file, wherein said detachable second storage means has a filing system structured by a file management area for managing the image file and a data area for storing the image data of the image file; and writing control means for writing file management information corresponding to the image data into the file management area prior to writing of the image data to the data area for storing the image data of the image file in a case of storing the image data stored in said first storage means in said second storage means as the image file, said writing control means being arranged so as to perform the writing of the management information corresponding to the image data to the file management area only once.

3. An apparatus according to claim 2, wherein the file management area for managing the image files includes an entry to the image file and link information to the data area for storing the image data of the image file, as the file management information of the image data.

4. An apparatus according to claim 2, wherein the file management information stored in the file management area for managing the image file includes link information to the data area for storing the image data of the image file, and the data area for storing the image data of the image file includes entry information to the image data file and the image data of the image file.

5. An image pickup apparatus comprising:

image data creation means for digitizing an analog image signal obtained by an image pickup element and creating image data by converting the digitized image data into desired format image data;

first storage means for temporarily storing the image data;

detachable second storage means for storing the image data as an image file, wherein said detachable second storage means has a filing system structured by a file management area for managing the image file and a data area for storing the image data of the image file; and writing control means for writing the management information corresponding to the image data to the file management area prior to writing of the image data to the data area for storing the image data of the image file in a case of storing the image data stored in said first storage means in said second storage means as the image file, wherein when plural image data not written to said second storage means exist in said first storage means, said writing control means performs the writing of file management information of latter shot image data prior to the writing of the former shot image data, and the former shot image data which is not written is written after terminating the writing of the file management information of the latter shot image data.

6. An apparatus according to claim 5, wherein said writing control means sequentially writes the image data of plural images not written to said second storage means after completion of the writing of the file management information.

7. An image pickup apparatus comprising:

image data creation means for digitizing an analog image signal obtained by an image pickup element and creating image data by converting the digitized image data into desired format image data;

first storage means for temporarily storing the image data;

detachable second storage means for storing the image data as an image file, wherein said detachable second storage means has a filing system structured by a file management area for managing the image file and a data area for storing the image data of the image file;

writing control means for writing the management information corresponding to the image data to the file management area prior to writing of the image data to the data area for storing the image data of the image file in a case of storing the image data stored in said first storage means in said second storage means as the image file; and a storage area which can be electrically backed up in said first storage means, wherein the file management information of the image data is stored in said storage area.

8. An apparatus according to claim 7, wherein the storage area which can be electrically backed up is not used to back up the image data.

9. An apparatus according to claim 7, wherein the file management information of the image data stored in the storage area which can be electrically backed up is written in said second storage means, and after the filing system is protected, among the image files, management information of the file which includes the image data which is not written is deleted from said first storage means.

10. An apparatus according to claim 2, wherein the filing system is compatible with a FAT (file allocation table) system, and the file management area in said second storage means is structured by a root directory and the FAT, and the data area is a cluster area managed by the FAT.

11. A storing method of image data, comprising:

a first storage step of temporarily storing image data in first storage means;

a second storage step of storing the image data in detachable second storage means as an image file; and a writing control step of writing of file management information corresponding to the image data into a file management area prior to writing of the image data to a data area in a case of storing the image data stored in said first storage step in said second storage means as an image file, said writing control step being arranged so as to perform the writing of the file management information corresponding to the image data to the file management area only once.

12. A storing method of image data, comprising:

an image data creation step of digitizing an analog image signal obtained by an image pickup element and creating image data by converting the digitized image data into desired format image data;

a first storage step of temporarily storing the created image data in first storage means;

a second storage step of storing the image data in detachable second storage means as an image file; and a writing control step of writing file management information corresponding to the image data into a file management area prior to writing of the image data to a data area for storing image data of the image file in a case of storing the image data stored in said first storage means in said second storage means as the image file, said writing control step being arranged so as to perform the writing of the file management information corresponding to the image data to the file management area only once.

13. A method according to claim 12, wherein the file management area for managing the image files includes an entry to the image file and link information to the data area for storing the image data of the image file, as the file management information of the image data.

14. A method according to claim 12, wherein the file management information stored in the file management area for managing the image file includes link information to the data area for storing the image data of the image file, and the data area for storing the image data of the image file includes entry information to the image data file and the image data of the image file.

15. A storing method of storing image data, comprising:
an image data creation step of digitizing an analog image signal obtained by an image pickup element and creating image data by converting the digitized image data into desired format image data;
a first storage step of temporarily storing the created image data in first storage means;
a second storage step of storing the image data in detachable second storage means as an image file; and
a writing control step of performing writing of the image data to a file management area prior to writing of the image data to a data area for storing image data of the image file in a case of storing the image data stored in said first storage means in said second storage means as the image file, wherein plural image data are stored in said first storage step, and said writing control step performs the writing of file management information of the latter shot image data prior to the writing of the former shot image data in a case where the image data which is not written in said second storage step exists, and the image data of the former shot image is written after terminating the writing of the file management information of the latter shot image data.

16. A method according to claim 15, wherein said writing control step sequentially writes the image data of plural images not written in said second storage step after completion of the writing of the file management information.

17. A storing method of storing image data, comprising:
an image data creation step of digitizing an analog image signal obtained by an image pickup element and creating image data by converting the digitized image data into desired format image data;
a first storage step of temporarily storing the created image data in first storage means;
a second storage step of storing the image data in detachable second storage means as an image file; and
a writing control step of performing writing of the image data to a file management area prior to writing of the image data to a data area for storing image data of the image file in a case of storing the image data stored in said first storage means in said second storage means as the image file,
wherein the data is recorded to a storage means which can be electrically backed up in said first storage step, and file management information of the image data is stored in said storage means when file management information of the shot image data is written in said second storage means.

18. A method according to claim 17, wherein the storage area which can be electrically backed up is used to back up the file management information of the image data and is not used to back up the image data.

19. A method according to claim 17, wherein the file management information stored in said first storage step is deleted after a filing system is protected in said second storage step.

20. A storage medium which stores a computer-readable program of executing a storing method of image data, comprising:
an image data creation step of digitizing an analog image signal obtained by an image pickup element and creating image data by converting the digitized image data into desired format image data;
a first storage step of temporarily storing the created image data in first storage means;
a second storage step of storing the image data in detachable second storage means as an image file; and
a writing control step of writing file management information corresponding to the image data into a file management area prior to writing of the image data to a data area for storing image data of the image file in a case of storing the image data stored in said first storage means in said second storage means as the image file, said writing control step being arranged so as to perform the writing of the file management information corresponding to the image data to the file management area only once.

* * * * *

UNITED STATES PATENT AND TRADEMARK OFFICE
CERTIFICATE OF CORRECTION

PATENT NO. : 7,016,091 B2 Page 1 of 1
APPLICATION NO. : 09/791589
DATED : March 21, 2006
INVENTOR(S) : Keihiro Kurakata It is certified that error appears in the above-identified patent and that said Letters Patent is hereby corrected as shown below:

COVER PAGE:
(56) References Cited FOREIGN PATENT DOCUMENTS,
"JP 06-095979 4/2000" should read -- JP 06-095979 4/1994 --.

COLUMN 2:
Line 53, "shot" should read -- the shot --; and
Line 59, "possibility" should read -- the possibility --.

COLUMN 3:
Line 2, "considered" should read -- was considered -- and "an" should be deleted;
Line 10, "unfitted" should read -- is unfitted --;
Line 47, "shot." should read -- the shot. --;
Line 49, "possibility" should read -- the possibility --;
Line 57, "considered" should read -- was considered -- and "an" should be deleted; and
Line 66, "slightly" should read -- is slightly --.

Signed and Sealed this

Second Day of January, 2007

JON W. DUDAS
*Director of the United States Patent and Trademark Office*